(12) United States Patent
Walsh

(10) Patent No.: US 7,797,120 B2
(45) Date of Patent: *Sep. 14, 2010

(54) TELESCOPE BASED CALIBRATION OF A THREE DIMENSIONAL OPTICAL SCANNER

(75) Inventor: Gregory Charles Walsh, Walnut Creek, CA (US)

(73) Assignee: Leica Geosystems AG, Heerbrugg (CH)

( * ) Notice: Subject to any disclaimer, the term of this patent is extended or adjusted under 35 U.S.C. 154(b) by 119 days.

This patent is subject to a terminal disclaimer.

(21) Appl. No.: 12/329,455

(22) Filed: Dec. 5, 2008

(65) Prior Publication Data

US 2010/0145649 A1 Jun. 10, 2010

(51) Int. Cl.
G01B 11/26 (2006.01)

(52) U.S. Cl. .......................... 702/94; 356/140; 73/1.75; 73/1.76

(58) Field of Classification Search .................. 702/94; 356/140; 73/1.75, 1.76
See application file for complete search history.

(56) References Cited

U.S. PATENT DOCUMENTS

| 5,531,093 A | * | 7/1996 | Polites et al. | ................. 73/1.75 |
| 7,643,135 B1 | * | 1/2010 | Walsh | ......................... 356/140 |
| 2008/0236568 A1 | * | 10/2008 | Hickerson et al. | ............ 126/578 |

OTHER PUBLICATIONS

U.S. Appl. No. 12/329,449, filed Dec. 5, 2008, Gregory Charles Walsh.

* cited by examiner

Primary Examiner—Sujoy K Kundu
(74) Attorney, Agent, or Firm—Workman Nydegger

(57) ABSTRACT

An embodiment of the invention includes using a set of telescopes to calibrate a three dimensional optical scanner. Three separate calibrations are disclosed for a survey grade calibration: (1) angular calibration, implemented using at least one anti-podal pair of telescopes, (2) range calibration, implemented using at least one telescope mounted fiber recirculator, and (3) tilt calibration, implemented using at least one pair of telescopes not mounted in anti-podal configuration and an integral tilt table. Methods for aligning or measuring the mis-alignment between anti-podal telescope pairs are also described.

12 Claims, 8 Drawing Sheets

TELESCOPE BASED CALIBRATION OF A THREE DIMENSIONAL OPTICAL SCANNER

CROSS-REFERENCE TO RELATED APPLICATIONS

Not applicable.

BACKGROUND OF THE INVENTION

The acquisition of data and subsequent generation of computer models for real-world objects is of interest in many industries and for many applications including architecture, physical plant design, entertainment applications (e.g., in movies and games), surveying, manufacturing quality control, medical imaging and construction, as well as cartography and geography applications. In order to obtain accurate 3D models of an object, as well as the area in which that object exists in the real world, it is necessary to take accurate measurements, or samplings of surfaces that make up the object, and elements of the surrounding area. Historically, this sampling was carried out using techniques that provided samples at the rate of tens or hundreds per hour at most.

Recent advances in scanning technology, such as technologies utilizing LIDAR scanning, have resulted in the ability to collect billions of point samples on physical surfaces, over large areas, in a matter of hours. In a LIDAR scanning process, the scanning device scans a laser beam across a scene that encompasses the structure of interest and the beam reflected from the scene is captured by the scanning device. The scanning device thus measures a large number of points that lie on surfaces visible in the scene. Each scan point has a measured location in 3D space, within some measurement error, that typically is recorded relative to a point (x,y,z) in the local coordinate system of the scanner. The resulting collection of points is typically referred to as one or more point clouds, where each point cloud can include points that lie on many different surfaces in the scanned view.

Conventional LIDAR scanning systems do not natively create points but instead create sets of ranges with associated mirror angles which are converted to x, y and z coordinates. The function which maps these native measurements into x, y and z coordinates depends on how the scanner was assembled and, for high accuracy systems, is different for each scanner and is a function of temperature and other environmental conditions. The differences between scanner systems are typically represented by a collection of numbers called calibration parameters. The purpose of a calibration system is to estimate the calibration parameters.

Calibration systems for scanners today typically involve measuring a collection of known targets and from these observations estimating the calibration parameters. The scanner system will measure the locations of one or more targets. These same targets locations are measured by a trusted reference system, for example, a total station calibrated using some other method. The calibration parameters at this measurement condition are then estimated. The aforementioned process might be carried out at one or more temperatures.

Such an approach suffers from at least three problems. First, a secondary measuring system is needed to locate the laser scanner targets. Second, if the targets move between the time the targets are measured with the secondary measuring system and when the targets are measured by the scanner being calibrated, perhaps because the targets are, for example, affixed to portions of a building which deform with sunlight or other factors over time, these motions will introduce systematic errors into the calibration parameters. Third, the ability to estimate the calibration parameters is no better than the ability to locate the targets with the scanner and the secondary measuring system. The further away a target is from the scanner the better the estimate of the angle portion of the calibration becomes. This has led the state of the art to large calibration systems with widely spaced targets. This requires a large stable space. The size of the space is costly and tends to aggravate the second problem; that is, targets remaining stable or fixed in position over time.

A total station is a manually operated optical instrument used in surveying. A total stations is a combination of an electronic theodolite (transit), an electronic distance meter (EDM) and software running on an external computer known as a data collector. With a total station one may determine angles and distances from the instrument to points to be surveyed. With the aid of trigonometry and triangulation, the angles and distances may be used to calculate the coordinates of actual positions (x, y, and z or northing, easting and elevation) of surveyed points, or the position of the instrument from known points, in absolute terms. Most modern total station instruments measure angles by means of electro-optical scanning of extremely precise digital bar-codes etched on rotating glass cylinders or discs within the instrument. The best quality total stations are capable of measuring angles down to 0.5 arcseconds. Inexpensive "construction grade" total stations can generally measure angles to 5 or 10 arcseconds.

Total stations solve the high accuracy angular calibration problem by using collimating telescopes. The total station to be calibrated is placed on a stable fixture. Telescopes, which have a target behind a set of lenses, are used as targets. By placing a set of lenses in front of their targets, the target appears to be located at a great distance, perhaps even hundreds of meters away when in fact the target is less than one meter away. This technique reduces the size of the angular portion of the total station calibration system to a few square meters. The reduced size also helps with the stability of the targets, since the targets are physically close together and can be mounted in the same stable base, typically made from concrete. Even the stability of the targets is not critical. The total station calibration system removes the need for a secondary measurement system or great stability by observing these targets in both faces.

In a two face measurement the total station is placed onto a stable mount. The operator then observes the targets in the telescopes through the telescope of the total station. The measurement is repeated in the second face; that is, by rotating the total station by 180 degrees, or one half of a revolution, on its base and repeating the measurements. The angular measurements are saved and from these observations both the locations of the telescopes and the relevant total station parameters can be determined without the use of a secondary measurement system.

The collimating telescope needs some adaptation to be used for laser scanners because laser scanners emit a laser beam whose location needs to be found. Additionally, the total station calibration method of using two face measurements and no secondary measurement system fails when applied to laser scanners. A typical laser scanner must move the laser beam very quickly. Generally this is done by using mirrors instead of by moving the laser. If the laser is moved entirely, the total station method of calibration is applicable because the uncertainty in the mounting of the laser beam behaves the same as the uncertainty in the elevation index and the total station collimation error. However, if mirrors move the laser beam, the uncertainty in the laser mounting are new parameters and the total station calibration method becomes ill conditioned for laser scanner calibration.

In summary, the state of the art in scanner calibration suffers from size, cost, and accuracy limitations because the calibration needs a secondary reference and accuracy is sensitive to the size and stability of the calibration system. The state of the art in total station calibration solves these problems but fails when adapted to laser scanner calibration. The total station calibration method fails to correctly identify all calibration parameters of the laser scanner because the way such laser scanners are physically arranged is different from total stations, i.e. because laser scanners use mirrors to deflect the laser beam.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

An embodiment of the invention includes an antipodal calibration rig for performing angular calibrations or tilt calibrations of three dimensional optical scanning systems. The antipodal calibration rig includes a first telescope mounted on the rig and a second telescope mounted on the rig. The antipodal calibration rig also includes a base for a scanner located within the antipodal calibration rig. The base is configured such that when the scanner is placed on the base the scanner is on an axis of the first telescope and an axis of the second telescope.

Another embodiment of the invention includes a method for aligning a first telescope and a second telescope in an antipodal pair. The telescopes include alignment lasers and a means for observing the first telescope and second telescope is located between the first telescope and second telescope. The method includes comparing the position of a first beam of a first alignment laser of the first telescope against the position of a second beam of a second alignment laser of the second telescope at the first telescope. The method also includes comparing the position of the first beam against the position of the second beam at the second telescope. The method further includes adjusting the first telescope and the second telescope until the beams of the first alignment laser and second alignment laser are parallel.

Another embodiment of the invention includes a method for angular calibration of a three dimensional optical scanning system. The method includes locating the three dimensional optical scanning system within an antipodal calibration rig. The antipodal calibration rig includes a first telescope mounted on the antipodal calibration rig and a second telescope mounted on the antipodal calibration rig. The first telescope is aligned antipodal to the second telescope and the scanner is on an axis of the first telescope and an axis of the second telescope. The method also includes measuring the angular location of the first telescope and measuring the angular location of the second telescope in two faces. The method further includes estimating a set of angular calibration parameters for the three dimensional optical scanning system from the measurements.

Another embodiment of the invention includes a method for calibrating a tilt sensor of a three dimensional optical scanning system. The method includes locating the scanning system on a tilt table within an antipodal calibration rig. The antipodal calibration rig includes one or more telescopes mounted on the antipodal calibration rig. The one or more telescopes are used to measure the tilt of the three dimensional optical scanning system. The method also includes performing an angular calibration on the three dimensional optical scanning system and solving for a tilt index of the three dimensional optical scanning system. Solving for the tilt index involves rotating the scanner and observing the changes of the tilt sensor and is well known in surveying as a two face adjustment of the tilt. The method further includes performing a set of steps including: moving the tilt table to a next tilt position; obtaining an actual output of the tilt sensor; measuring the position of the two or more telescopes; and computing the expected output of the tilt sensor using the measured position of the two or more telescopes. The method includes repeating the set of steps for three or more tilt positions of the three dimensional optical scanning system and computing an estimated tilt sensor model using the measurements.

Another embodiment of the invention includes a method for determining a range scale of a three dimensional optical scanning system. The method includes transmitting a beam from the three dimensional optical scanning system to a range calibration rig. The method also includes splitting the beam from the three dimensional scanning system at the range calibration rig. The first portion of the beam from the three dimensional scanning system enters a recirculating fiber loop to be returned to the beam splitter and the second portion from the three dimensional scanning system enters a transmitting lens. The method further includes transmitting the beam from the transmitting lens back to the scanning system, measuring the time between pulses at the scanning system and calculating range data from the time between pulses. Two such assemblies can be placed on opposite sides of the scanner in order to estimate the range offset of the scanning system.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Calibration of total stations, and other scanning systems, is a well known process. However, this process is not well suited to three dimensional optical scanning systems including LIDAR scanners. Three dimensional optical scanning systems have additional degrees of uncertainty in their calibrations compared to total stations. These additional degrees of uncertainty result from, among other things, mirrors being using to change the position of the laser beam used in the scan. To overcome these problems, an alternative calibration methodology is needed and disclosed hereinafter.

I. Antipodal Calibration Rig

Figure 1A:
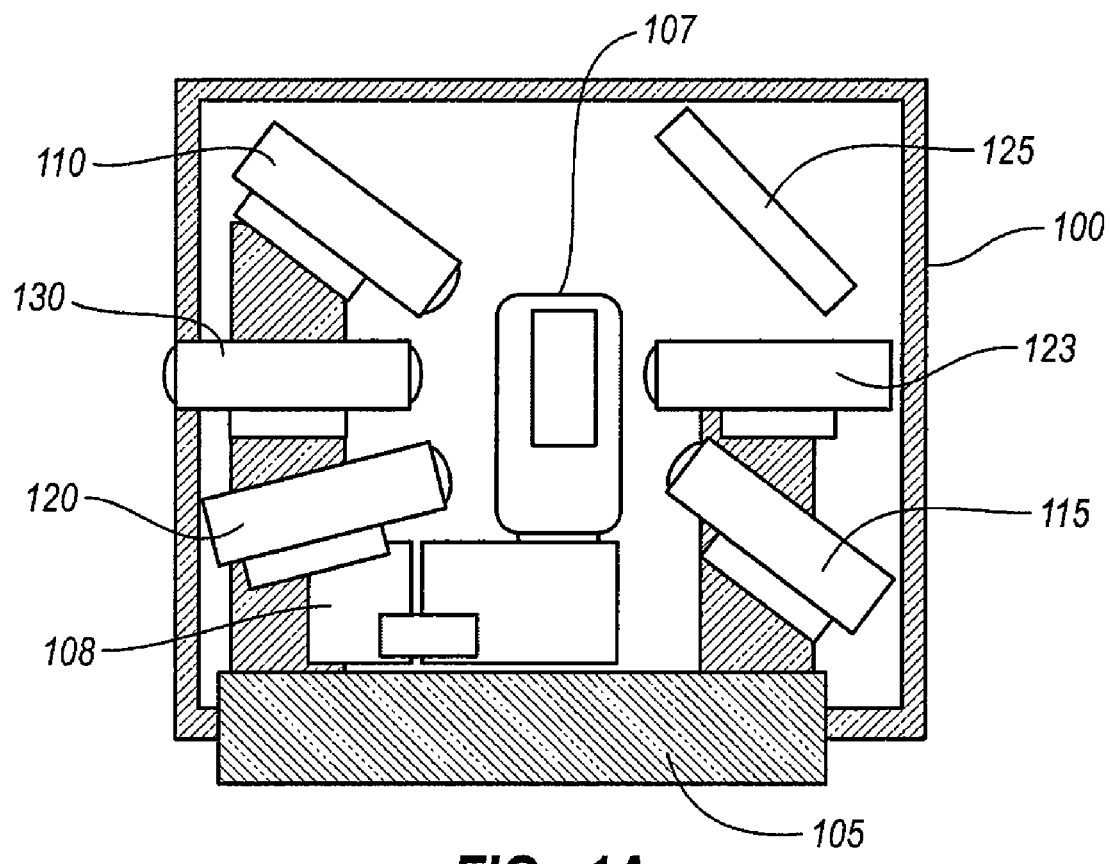
FIG. 1A illustrates an example of an antipodal calibration rig.
Figure 1B:
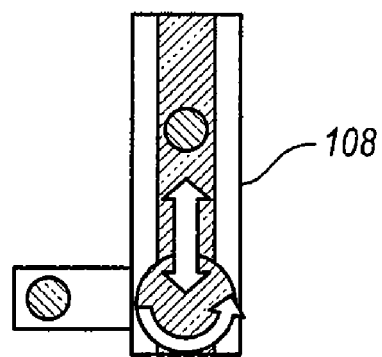
FIG. 1B illustrates a four axis scanner manipulator of FIG. 1A.

FIG. 1A illustrates an example of an antipodal calibration rig 100. This example contains an antipodal telescope pair, 110 and 115, as well as other telescopes. The antipodal calibration rig 100 can be used for angular calibrations (as described in section III below), tilt calibrations (as described in section IV below), and/or range calibrations (as described in section V below). In some embodiments, the antipodal calibration rig 100 includes a base 105 for a scanner 107 within the calibration rig 100. The base 105 can include a four axis scanner manipulator 108. FIG. 1B illustrates the four axis scanner manipulator 108 of FIG. 1A. The four axis scanner manipulator 108 allows for small tilt movements of the scanner 107 about two axis, otherwise known as a tilt table, and a rotation about one axis, typically the standing axis of the scanner 107. In addition, the manipulator 108 allows a gross translation of the scanner 107 in order to remove the unit from between the antipodal telescopes. Alternatively, the base 105 can include only tilt table (not shown), which has a top that can tilt in one or more directions, or any other device that allows proper movement of the scanner, including displacement and rotation.

In some embodiments, the calibration rig 100 includes one or more telescopes 110, 115, 120 and 123. A telescope as used herein includes a target behind a lens designed for the collection or focus of electromagnetic radiation. For example, the calibrations rig 100 can include a first telescope 110 and a second telescope 115. In some embodiments, the axis of the first telescope 110 and the axis of the second telescope 115 can be aligned antipodal to one another. In mathematics, the antipodal point of a point on the surface of a sphere is the point which is diametrically opposite the original point—so situated that a line drawn from the one to the other passes through the centre of the sphere and forms a true diameter. Therefore, telescopes aligned antipodal to one another are telescopes that face each other and have axes that are substantially parallel to one another. Aligning telescopes in an antipodal pair may eliminate a degree of uncertainty, because the telescopes are in an antipodal pair, their orientations with respect to one another are known. In other embodiments, the axis of the first telescope 110 and the axis of the second telescope 115 can be perpendicular to one another. In further embodiments, the axis of the first telescope 110 and the axis of the second telescope 115 can be at some other angle relative to one another.

In other embodiments, the antipodal calibration rig 100 can include more than two telescopes. For example, the antipodal calibration rig 100 can include a third telescope 120 and a fourth telescope 123. The axis of the third telescope 120 can be perpendicular to the axis of the first telescope 110. Additionally, the third telescope 120 can be antipodal to the fourth telescope 123. Therefore, the calibration rig 100 can include four telescopes aligned in 90 degree intervals around a circle. Antipodal alignment of one or more pair of telescopes may eliminate a degree of uncertainty (i.e. an unknown calibration parameter) because the alignment of one telescope relative to the other is known (as described in section II below). Although example configurations are given, one of skill in the art will appreciate that the telescopes 110, 115, 120 and 123 can be aligned in any combination to best calibrate the scanner 107.

In some embodiments, the antipodal calibration rig 100 includes targets 125 that are not within a telescope. Targets 125 can be used much the same way as telescopes. However, telescopes have the advantage over targets 125 that telescopes appear to be much farther away. The increased "range" provided by the telescopes allows more precise calibration. In some embodiments, the antipodal calibration rig 100 includes range calibration elements 130.

In some embodiments, the telescopes 110, 115, 120 and 123 of the antipodal calibration rig 100 can include alignment lasers. The alignment lasers can be used to indicate the axis of the telescopes 110, 115, 120 and 123. This information may be used to align the telescope or other telescopes antipodal to one another (as described below in section II). The beam of the alignment lasers may be round or may be a reticle projection. A reticle or crosshair is a shape superimposed on an image that is used for precise alignment of a device. Crosshairs are most commonly represented as intersecting lines in a "+" shape, though many variations exist, including dots, posts, circles, scales, chevrons, or a combination of these. A reticle projection may allow for more precise alignment of the telescopes 110, 115, 120 and 123.

Additionally, the targets in the telescopes 110, 115, 120 and 123 may include autocollimators. An autocollimator is an optical instrument for non-contact measurement of angles. Some autocollimators work by projecting an image onto a target mirror, and measuring the deflection of the returned image against a scale, either visually or by means of an electronic detector. Therefore, the autocollimators can be used to detect the location of an incoming laser beam.

In some embodiments, the antipodal calibration rig 100 can be part of an antipodal calibration system (not shown). An antipodal calibration system includes an antipodal calibration rig 100 and an environmental chamber (not shown). The environmental chamber includes temperature controls and is of sufficient size to surround the antipodal calibration rig 100 (i.e. the antipodal calibration rig 100 is placed within the environmental chamber). This allows for calibrating three dimensional scanning systems at multiple temperatures. Alternately the telescopes 110, 115, 120 and 123 can be placed outside the environmental chamber and the scanner 107 placed inside the chamber. In such an embodiment, high quality windows allow the telescopes 110, 115, 120 and 123 to view the scanner inside the chamber.

II. Antipodal Alignment

Figure 2:
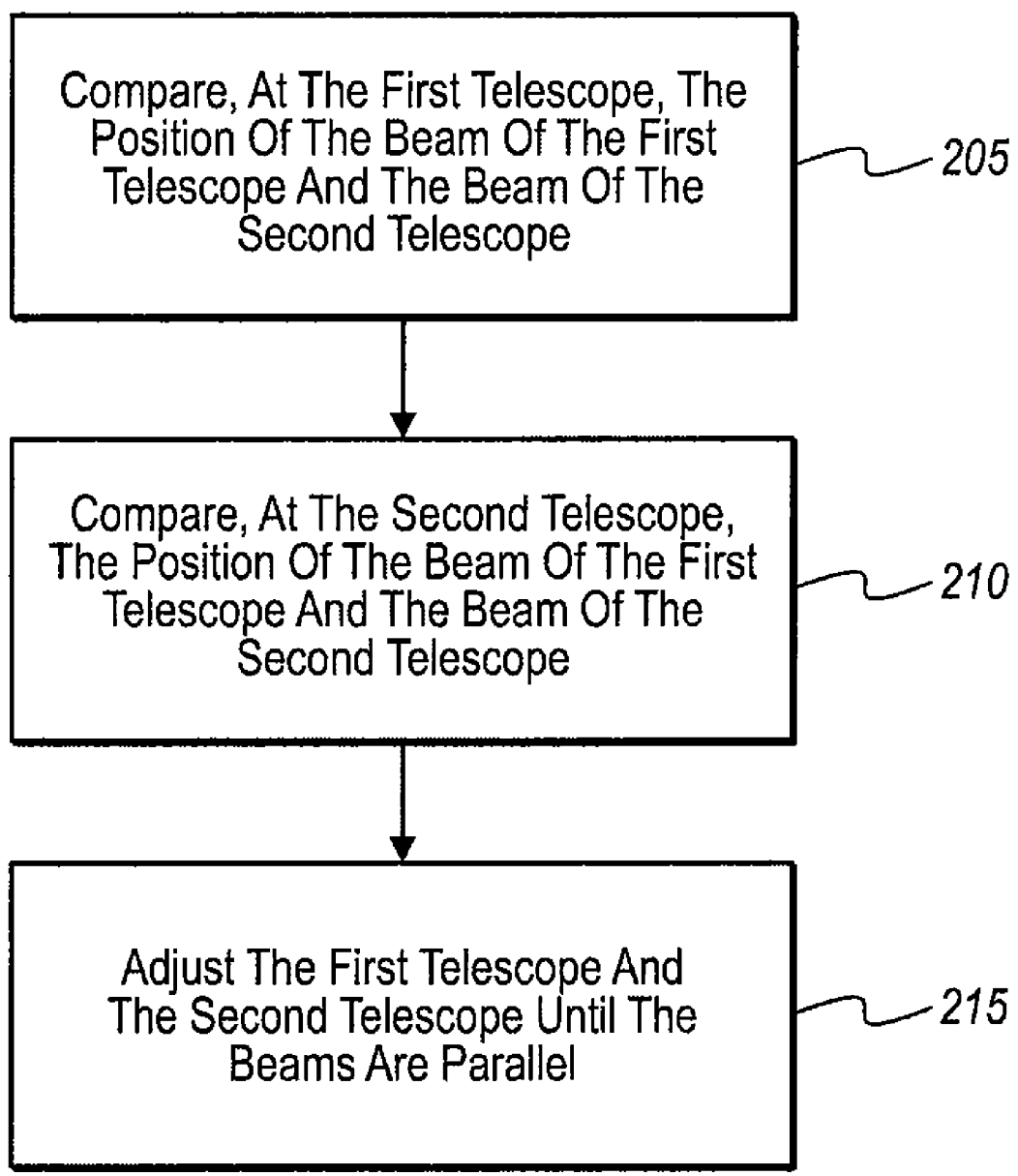
FIG. 2 is a flow diagram illustrating an example of a method for aligning a first telescope and a second telescope in an antipodal pair.

FIG. 2 is a flow diagram illustrating an example of a method (200) for aligning a first telescope and a second telescope in an antipodal pair (e.g. in an antipodal calibration rig as described in section I above). Telescopes aligned antipodal to one another are telescopes that face each other and have axes that are substantially parallel to one another. Aligning telescopes in an antipodal pair may eliminate a degree of uncertainty. Because the telescopes are in an antipodal pair, their orientations with respect to one another are known, thus eliminating a degree of uncertainty.

Figure 3:
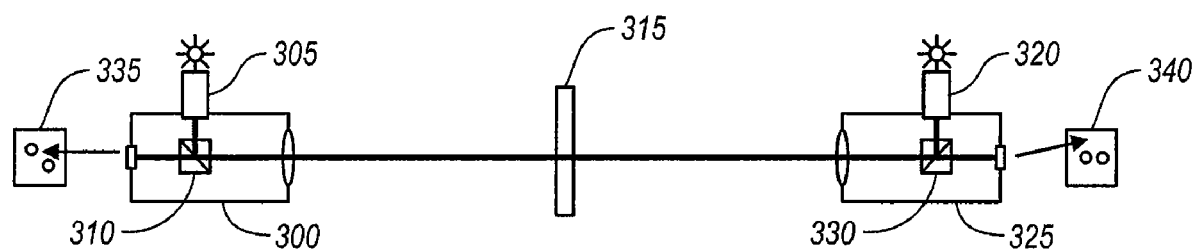
FIG. 3 illustrates an embodiment for comparing the position of alignment lasers using a beam splitter.

The method (200) includes comparing, at the first telescope, the position of the beam of the first telescope and the beam of the second telescope (205). The positions of the beams of the first telescope and the second telescope can be compared in any appropriate manner. FIG. 3 illustrates an example of comparing the position of alignment lasers using a beam splitter. A beam splitter is an optical device that splits a beam of electromagnetic (EM) radiation into two parts. The first telescope 300 includes a first alignment laser 305. The first alignment laser 305 can be used to indicate the axis of the first telescope 300. The beam of the first alignment laser 305 may be round or may be a reticle projection.

The first alignment laser 305 is directed out of the first telescope 300. For example, a beam splitting cube 310 can be used to direct the beam of the first alignment laser 305 out of the first telescope. A beam splitting cube 310 can be made from two triangular glass prisms which are glued together at their base using, for example, Canada balsam. The thickness of the resin layer is adjusted such that (for a certain wavelength) portion of the EM radiation incident through one "port" (i.e. face of the cube) is reflected and the other portion is transmitted. The first beam splitting cube 310 directs the beam of the first alignment laser 305 out of the first telescope 300.

After the beam of the first alignment laser 305 exits the first telescope 300 the beam encounters a third beam splitter 315. The third beam splitter 315 can be a half-silvered mirror. A half-silvered mirror can include a plate of glass with a thin coating of aluminum (usually deposited from aluminum vapor) with the thickness of the aluminum coating such that a first portion of the incident light is transmitted and a second portion is reflected.

Similarly, a second alignment laser 320 on the second telescope 325 is split at a second beam splitting cube 330 and directed out of the second telescope 325. The beam of the second alignment laser 320 encounters the third beam splitter 31 5, with the first portion of the light transmitted and the second portion of the light reflected.

The second portion of the first beam (which is reflected at the third beam splitter 315) and the first portion of the second beam (which is transmitted through the third beam splitter 315) continue to the first telescope 300 where the second portion of the first beam and the first portion of the second beam encounter the first beam splitting cube 310. A portion of the beams pass through the first beam splitting cube 310 where the second portion of the first beam and the first portion of the second beam are incident on a first target 335 within the first telescope 300. The first target 335 can include an autocollimator, a position sensitive diode, a focal plane array or any other device for detecting the position of the first beam and the second beam. An autocollimator is an optical instrument for non-contact measurement of angles. A position sensitive diode (PSD—a.k.a. position sensitive device or position sensitive detector) is an optical position sensor that can measure the position of a light spot in one or two-dimensions on a sensor surface. A focal-plane array (FPA—a.k.a. staring array, staring-plane array, or focal-plane, camera) is an image sensing device consisting of an array (typically rectangular) of light-sensing pixels at the focal plane of a lens. One of skill in the art will recognize that any device that can adequately detect the positions of the first beam and the second beam can be used as the first target 335. The position of the first beam and the second beam can be compared at the first telescope 300 simultaneously in the embodiment of FIG. 3.

Figure 4:
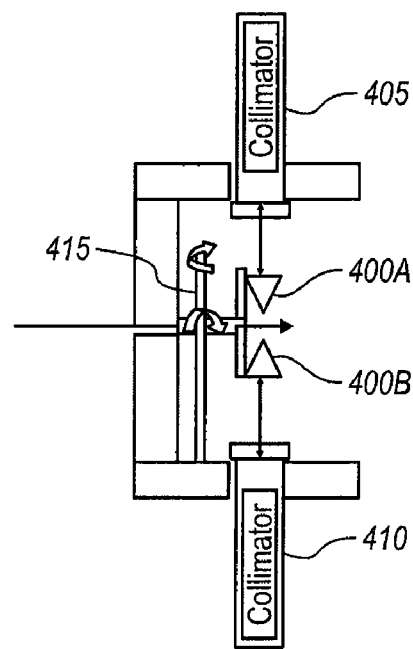
FIG. 4 illustrates an alternative embodiment for comparing the position of alignment lasers using corner cubes.

FIG. 4 illustrates an alternative embodiment for comparing the position of alignment lasers using corner cubes. A pair of corner cubes 400A and 400B is used to reflect the first beam back to the first telescope 405 and the second beam back to the second telescope 410. A corner cube (a.k.a. corner reflector) is a retroreflector consisting of three mutually perpendicular, intersecting flat surfaces, which reflects electromagnetic (EM) waves back towards the source. A retroreflector (sometimes called a retroreflector) is a device or surface that reflects EM waves back to their source with a minimum scattering. An electromagnetic wave front is reflected back along a vector that is parallel to but opposite in direction from the wave's source. Therefore, the first corner cube 400A reflects the first beam back to the first telescope 405. The position of the first beam reaches a first target in the first telescope 405 where the position of the first beam is detected.

The pair of corner cubes 400A and 400B can then be moved into a second position (e.g. rotated 90 degrees) where the pair of corner cubes 400A and 400B do not reflect the alignment laser beams. In some embodiments, the pair of corner cubes 400A and 400B can be located on a rotating arm 415 to facilitate their movement. The beam of the second alignment laser then reaches the first telescope 405 where the position of the beam of the second alignment laser can be detected and the position of the beam of the first alignment laser and the position of the beam of the second alignment laser can be compared at the first telescope 405. The position of the first beam and the second beam can be compared at the first telescope 405 sequentially in the embodiment of FIG. 4.

Returning again to FIG. 2, the method (200) further includes comparing, at the second telescope, the position of the beam of the first telescope and the beam of the second telescope (210). In the embodiment of FIG. 3, the first portion of the first beam (which is transmitted through the third beam splitter 315) and the second portion of the second beam (which is reflected at the third beam splitter 315) continue to the second telescope 325 where the first portion of the first beam and the second portion of the second beam encounter the second beam splitting cube 330. A portion of the beams pass through the second beam splitting cube 330 where the first portion of the first beam and the second portion of the second beam are incident on a second target 340 within the second telescope 330. The positions of the beams can be compared at the second target 340 in the same manner as the comparison at the first target or in a different manner. The positions of the first beam and the second beam can be compared at the second telescope 340 simultaneously in the embodiment of FIG. 3.

One of skill in the art will recognize that the third beam splitter 315 in the embodiment of FIG. 3 need not be positioned directly between the first telescope 300 and the second telescope 325, but can be positioned anywhere that allows adequate reflection of a portion of each beam to the originating telescope and passes the remaining portion to the other telescope. In some embodiments, the third beam splitter 315 can be positioned so that a scanner (not shown) can be placed along the path of the beams, about midway between the first telescope 300 and the second telescope 325, for calibration. Additionally, the alignment lasers 305 and 320 may be of a different wavelength than the scanner, which indicates the beam splitter may be remain in place during angular calibration.

In the embodiment of FIG. 4, the second corner cube 400B reflects the second beam back to the second telescope 410. The second beam reaches a second target in the second telescope 410 where its position is detected. The pair of corner cubes 400A and 400B can then be moved into a second position (e.g. rotated 90 degrees) where the pair of corner cubes 400A and 400B do not reflect the alignment laser beams. The beam of the first alignment laser then reaches the second telescope 410 where the position of the beam of the first alignment laser can be detected and the position of the beam of the first alignment laser and the position of the beam of the second alignment laser can be compared at the second telescope 410. The position of the first beam and the second beam can be compared at the second telescope 410 sequentially in the embodiment of FIG. 4.

One of skill in the art will recognize that the pair of corner cubes 400A and 400B need not be positioned directly between the first telescope and the second telescope, but can be positioned anywhere that the corner cubes 400A and 400B can adequately reflect a portion of each beam to the originating telescope and pass the remaining portion to the other telescope. In some embodiments, the pair of corner cubes 400A and 400B can be closer to one telescope so that a scanner can be placed along the path of the beams, about midway between the first telescope 405 and the second telescope 410, for calibrations. In other embodiments, there may be a gap between the corner cubes 400A and 400B to allow a scanner to be placed between the corner cubes 400A and 400B, about midway between the first telescope 405 and the second telescope 410, for calibrations.

Referring again to FIG. 2, the method (200) further includes adjusting the first telescope and the second telescope until the beams are parallel (215). The adjustment can be accomplished by moving the telescopes or by aligning the telescopes in some other way. For example, mirrors within the telescope can be moved to adjust the first telescope and the second telescope. The beams can be further adjusted until the beams are collinear (i.e. the first telescope and the second telescope share a common axis).

The step of adjusting the first and second telescopes so that the beams are collinear can be eliminated if theses telescopes are calibrated as autocollimators and the relative orientation of the telescopes are known. Given the position of the alignment laser on the PSD or FPA inside the telescope, the angular direction of the laser beam in the coordinate frame of the telescope can be known in the telescope coordinate frame. Hence with either the corner cube reflectors shown in FIG. 4 or the beam splitter shown in FIG. 3, one can measure the angular position of both alignment laser beams in both telescope coordinate frames. The relative orientation of the two telescopes can then be found. This is equivalent to having the telescopes collinear, that is, properly aligned.

Figure 5A:
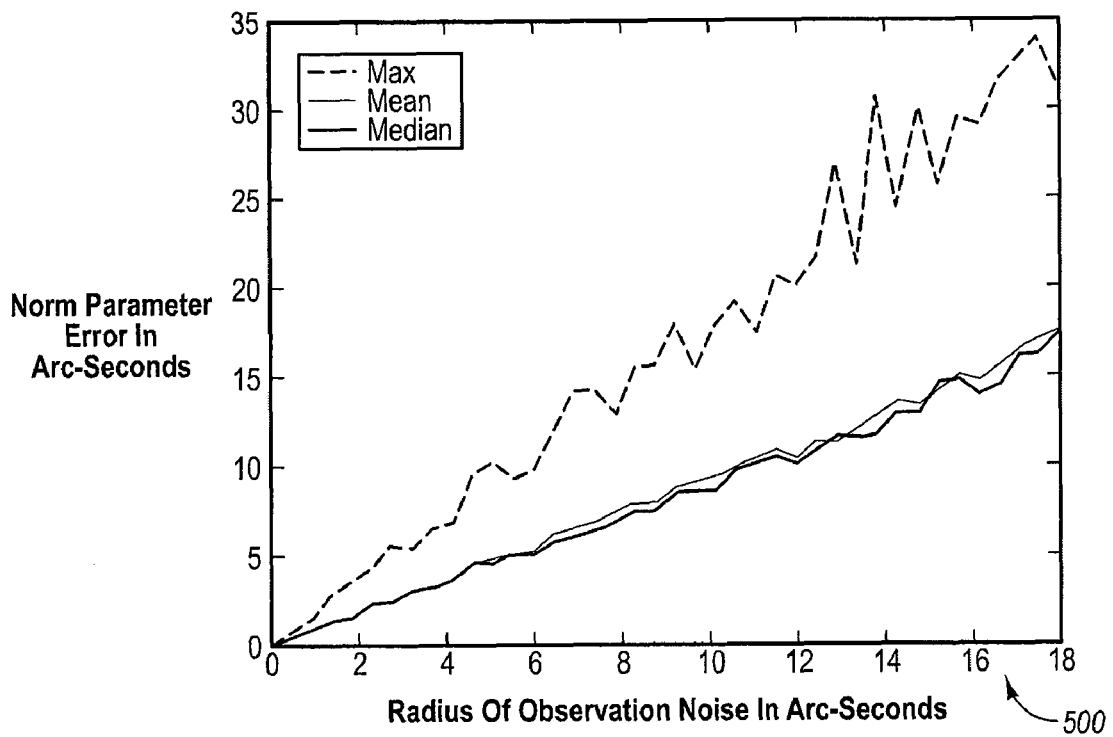
FIG. 5A illustrates a simulation of the error in calibration parameters due to measurement noise.
Figure 5B:
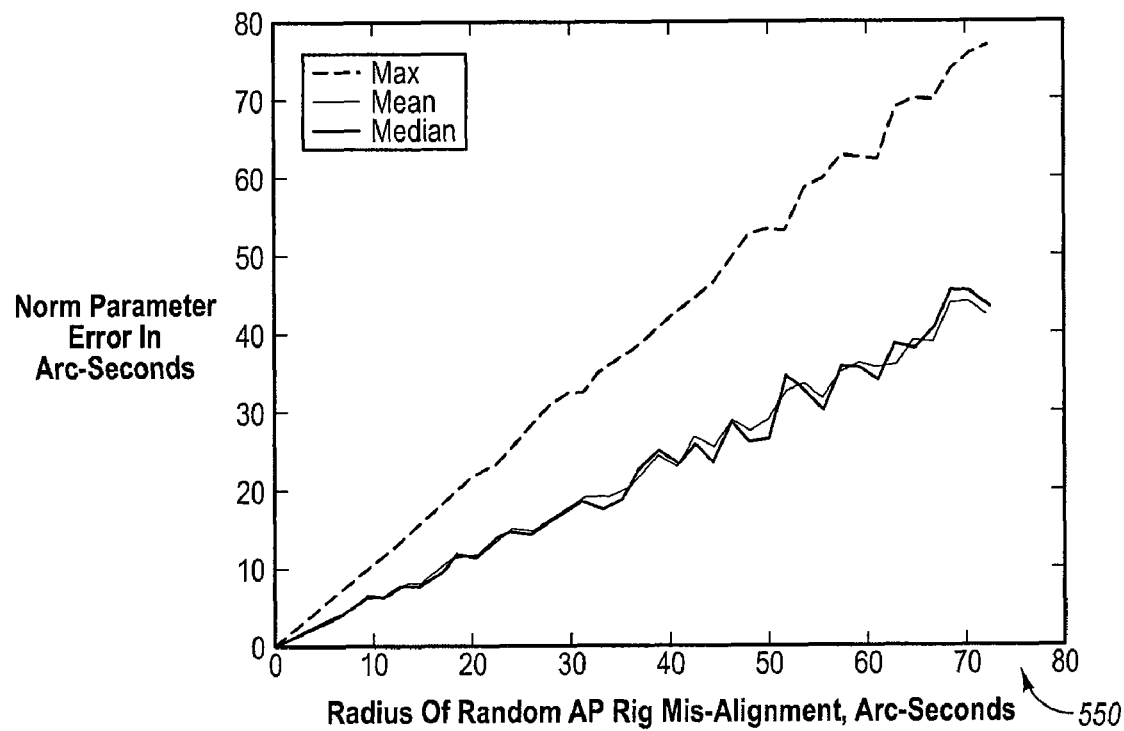
FIG. 5B illustrates a simulation of the error in calibration parameters due to misalignment of an antipodal pair of telescopes used in calibrating the scanner.

Knowing the relative alignment of the first telescope and the second telescope in a proper antipodal pair can be critical in properly calibrating a scanner. FIG. 5A illustrates a simulation 500 of the error in calibration parameters due to measurement noise. FIG. 5B illustrates a simulation 550 of the error in calibration parameters due to misalignment of an antipodal pair of telescopes used in calibrating the scanner. The error in calibration parameters due to noise is roughly linear with a slope approximately equal to the square root of 2 (approximately 1.4). The error in calibration parameters due to antipodal alignment is roughly linear with a slope approximately equal to the square root of eight (approximately 2.8). Therefore, misalignment or mis-estimation of the relative alignment of the antipodal pair can cause appreciable error in the calibration parameters. Alternatively, proper alignment of the antipodal pair can lead to a high degree of accuracy in the calibration parameters of a scanner, leading to more accurate measurements by the scanner.

III. Angular Calibration

Angular calibration is a method which estimates the angular parameters of a scanner. The angular calibration parameters allow a user to compute the direction of scanner laser beam using the scanner internal measurements such as the encoder angles. Using the direction of the laser beam together with the properly adjusted range, a coordinate or measurement in either Cartesian or spherical coordinates may be returned. The spherical coordinate system is a coordinate system for representing geometric figures in three dimensions using three coordinates: (1) the radial distance of a point from a fixed origin, (2) the zenith (or elevation) angle from the positive z-axis to the point, and (3) the azimuth angle from the positive x-axis to the orthogonal projection of the point in the x-y plane. However, regardless of the coordinate system used, accurate angular measurements are important for the accuracy of the scanner. While the scanner may be configured to emulate spherical or other coordinate systems, the internal measurements of the scanner alone such as encoder angles and ranges must first be transformed using angular and range calibration parameters in order to create measurements independent of the scanner.

Figure 6:
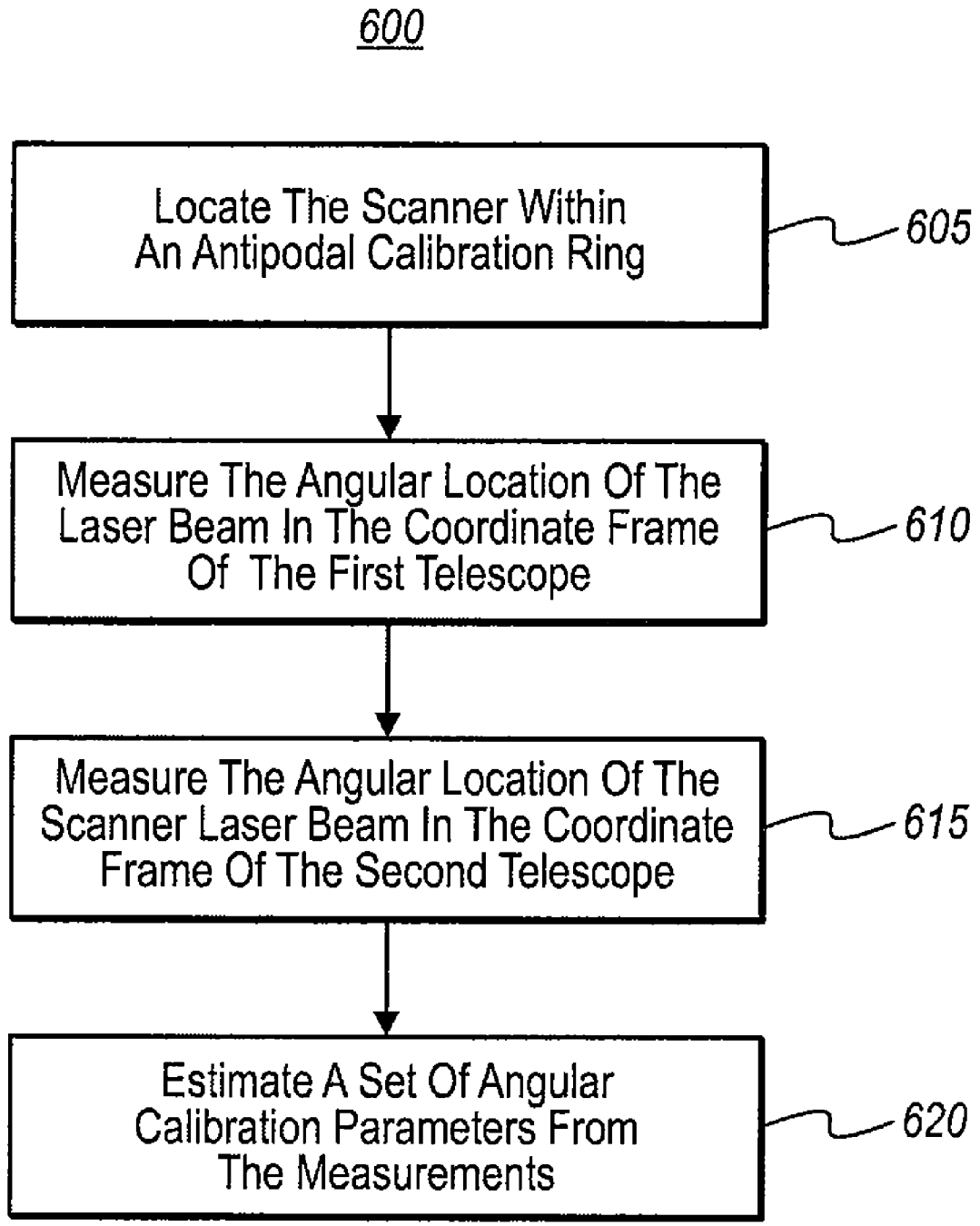
FIG. 6 is a flow diagram illustrating an example of a method for performing an angular calibration of a three dimensional scanning system.

FIG. 6 is a flow diagram illustrating an example of a method for performing an angular calibration of a three dimensional scanning system (600). The three dimensional scanning system may include a Light Imaging Detector and Ranging (LIDAR) scanner or any other type of three dimensional scanning system.

The method (600) includes locating the scanner within an antipodal calibration rig (605) (e.g. an antipodal calibration rig as described in section I above). In some embodiments, the antipodal calibration rig includes a first telescope and a second telescope. The first telescope and second telescope may be either aligned antipodally or of known relative orientation (e.g. using the method described in section II above). The scanner is located on the axis of the first telescope and the axis of the second telescope. By aligning the first telescope and the second telescope antipodally, a degree of uncertainty may be eliminated. The antipodal telescopes have either parallel axes, therefore it is known that the two axes are 180 degrees apart, or have a known relative alignment, with two axis apart by a known amount This known quantity eliminates one degree of uncertainty, or one variable, in the calibration. In other embodiments, the antipodal calibration rig may include more than two telescopes and one or more targets in addition to the first telescope and the second telescope.

The first telescope and/or the second telescope can include a target. The target can include an autocollimator, a position sensitive diode, a focal plane array or any other device for detecting the position of the scanner beam. An autocollimator is an optical instrument for non-contact measurement of angles. A position sensitive diode is an optical position sensor that can measure a position of a light spot in one or two dimensions on a sensor surface. A focal-plane array is an image sensing device consisting of an array (typically rectangular) of light-sensing pixels at the focal plane of a lens. One of skill in the art will recognize that any device that can adequately detect the positions of the scanner beam can be used as a target.

The method (600) also includes measuring the angular location of the laser beam in the coordinate frame of the first telescope (610) by pointing the scanner laser beam into the telescope and reading both the position on the telescope target and the internal scanner angles Hence the direction of the scanner laser beam is known in the coordinate frame of the telescope, and this direction is associated with a set of scanner angular measurements. In some embodiments, the measurement can be taken at a point on the telescope target which corresponds exactly to the location of one or both telescope alignment laser beams. In other embodiments, the calibration of the telescope and target is used to measure the relative location of the scanner laser beam to the alignment beams. In some embodiments, measuring the angular location of the laser beam of the scanner with respect to the first telescope (610) includes measuring the angular location using a two face measurement. A two face measurement includes observing the telescope, rotating the scanner about the base (rotating around the z-axis, or the zero of the zenith axis) 180 degrees, and repeating the observation of the same telescope. A rotation about the zenith axis of 180 degrees should produce a subsequent measurement of the zenith angle approximately equal to the initial measurement of the zenith angle. The angular direction of the laser beam for the second face measurement might not correspond to the same angular direction of the first face measurement, provided the telescope and target are calibrated and hence the direction of the laser beam is known in the telescope coordinate frame.

The method (600) further includes measuring the angular location of the scanner laser beam in the coordinate frame of the second telescope (615) in the same manner as described for the first telescope. In each case, the direction of the laser beam in the coordinate frame of the telescopes is measured together with the matching set of internal scanner angles, and this is done in both faces. The angular location of the second telescope can be described with two angles; the zenith angle from the positive z-axis to the telescope (specifically, the focal point of the telescope), and the azimuth angle from the positive x-axis to the orthogonal projection of the telescope (specifically, the focal point of the telescope) in the x-y plane. However the angular location of the first and second telescopes are not known. Because the telescopes are placed in an antipodal arrangement and they contain alignment lasers, their relative alignment is known and this is enough to solve the calibration and as a result the angular locations of the telescopes.

In some embodiments, measuring the angular location of the scanner laser beam in the coordinate frame of the second telescope includes measuring the angular location using a two face measurement. A rotation about the zenith axis of 180 degrees should produce a subsequent measurement of the zenith angle approximately equal to the initial measurement of the zenith angle. The angular direction of the laser beam for the second face measurement might not correspond to the same angular direction of the first face measurement, provided the telescope and target are calibrated and hence the direction of the laser beam is known in the telescope coordinate frame.

The method (600) further includes estimating a set of angular calibration parameters from the measurements (620). After the measurements are completed, the angular location of the laser beam is known in the coordinate frame of the telescopes for at least four different scanner laser beam directions, that is, both front and back face measurement on both telescopes. These observations can then be used to compute the scanner angular calibration parameters using standard nonlinear programming techniques, such as a modified bundle adjustment. The angular parameters may include azimuth offset, elevation offset, elevation alignment, mirror alignment, and laser alignment about y and z axes. Azimuth offset (or the zero of the azimuth angle) may be an exterior parameter and may be chosen by definition rather than by some intrinsic configuration of the scanner itself Elevation offset (the zero of the zenith angle) is the zero angle of the scanner perpendicular to the Azimuth axis. Elevation offset is relative to the azimuth ("standing") axis. Elevation alignment is the angle between the elevation axis and the azimuth axis. Ideally, elevation alignment would be exactly 90 degrees (perpendicular) but may not actually be 90 degrees, so the real elevation alignment must be known. Mirror Alignment is the alignment of the mirror of the scanner with respect to the elevation axis. Ideally mirror alignment would be 45 degrees, but will not actually be 45 degrees, so the real mirror alignment must be known. Laser Alignment about the y and z directions is the directional alignment of the laser beam relative to the elevation axis before the laser intersects the mirror. Ideally the laser would align with the x-axis (azimuth axis) but the deviation must be known.

In some embodiments, the angular parameters may be different than those listed above. Different sets of parameters may describe the same variations and in such a case a method to compute one set of parameters from the other would exist. Two parameterizations linked by such a method are considered equivalent. Other sets of parameterizations might include different variations in scanner behavior. In other embodiments, there are more or less parameters depending on manufacturing defects in the scanner and on the physical construction of the scanner. The method disclosed does not depend on the particular representation or parameterization of the scanner but rather on the use of telescopes which are placed in an antipodal manner and hence can observe their relative orientation.

IV. Tilt Calibration

Tilt calibration is a process which estimates the tilt calibration parameters of a tilt sensor mounted in a scanner. A tilt sensor measures the scanner's relative tilt around horizontal axes, or the pitch and roll of the scanner with respect to gravity. Knowing the direction of gravity with respect to the direction of the laser beam facilitates linking measurements taken at different times or locations together. Tilt calibration is critical to correlating measurements in the reference frame of the scanner to positions of measured points.

Figure 7:
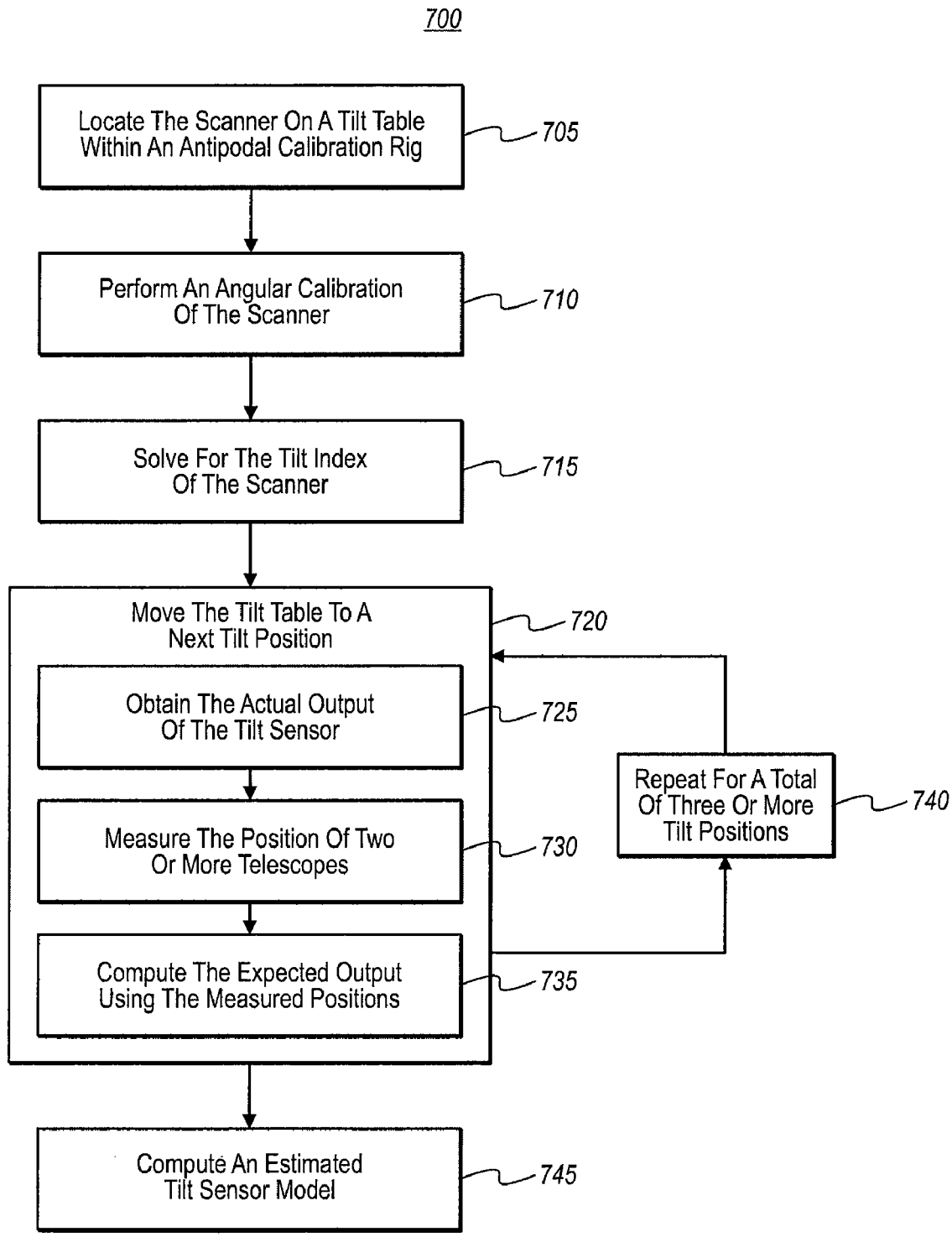
FIG. 7 is a flow diagram illustrating an example of a method for performing a tilt calibration of a three dimensional scanning system.

FIG. 7 is a flow diagram illustrating an example of a method for performing a tilt calibration of a three dimensional scanning system (700). The three dimensional scanning system may include a LIDAR scanner or any other type of three dimensional measuring system.

The method (700) includes locating the scanner on a tilt table within an calibration rig (705) (e.g. a telescope based angular calibration rig as described in section I above). A tilt table can tilt the scanner in one or more directions. The tilt table can, for example, be embodied by the four axis scanner manipulator. The antipodal calibration rig includes one or more telescopes mounted on the antipodal calibration rig. Two or more telescopes may be used as a reference to measure the tilt of the scanner.

The method (700) may also include performing an angular calibration of the scanner (710). Angular calibration can be performed according to the method described above in section III or can be performed in some other manner. Angular calibration ensures that the scanner is accurately measuring angles. However, regardless of the coordinate system used, accurate angular measurements are important for the accuracy of the scanner. Additionally, accurate tilt measurements require accurate angular measurements.

The method (700) further includes solving for the tilt index of the scanner (715). The tilt index is the offset of the tilt sensor. A tilt sensor may be mounted in some unknown way to a system. Therefore, a tilt measurement has no physical reference by itself In some embodiments, the system is rotated around the azimuth axis and tilt measurements are taken along the way. The tilt measurement will describe locally a circle. The center of the circle is this index. If the scanner is tilted until the tilt sensor read the index value, then rotating the scanner about the azimuth axis will not change the output of the tilt sensor. The location of the index can also be found by what is known as a two face tilt correction. The process consists of first measuring the output of the tilt sensor at one fixed location, then rotating the scanner about its azimuth axis by 180 degrees and measuring the output of the tilt location at the second location. The average output of the tilt sensor is then the index value.

Once the index of the tilt sensor is measured, the position of at least two telescopes is measured by pointing the laser beam into said telescope and measuring the laser beam location. Because the angular calibration of the scanner is known, the direction of the laser beam is known, and hence the location of the telescope in the coordinate frame of the scanner is determined. The two telescopes chosen should not be anti-podal or nearly so.

The method (700) also includes moving the tilt table to a next tilt position (720). In some embodiments, the next tilt position may be arbitrary. In other embodiments, the next tilt position can be calculated, or approximately calculated before moving the tilt table to the next tilt position. At the next tilt position an actual output of the tilt sensor is obtained (725). The tilt sensor of the scanner will indicate some tilt, even in the absence of calibration. This is the actual output of the tilt sensor. The position of two or more telescopes in relation to the next tilt position is also measured (730). Using the measurement of the position of the two or more telescopes, the actual change in orientation of the scanner can be computed. The actual change in orientation of the scanner can then be compared, after computing the expected output of the tilt sensor, to the measured output of the tilt sensor.

The method (700) also includes repeating for a total of three or more tilt positions (740), moving the tilt table to a next tilt position (720), obtaining the actual output of the tilt sensor (725), measuring the position of two or more telescopes (730) and computing the expected output using the measured positions (735). In some embodiments, repeating for a total of three or more tilt positions (740) includes repeating for a total of ten or more tilt positions. Repeating for a total of ten or more tilt positions may allow a set of estimated errors in the tilt parameters to be computed.

The method (700) further includes computing an estimated tilt sensor model by comparing the expected output of the tilt sensor to the actual output of the tilt sensor (745). In some embodiments, the tilt sensor model can include tilt in the calibration rig, scale factors, cross terms and orientation about gravity. Tilt in the calibration rig is the pitch and roll of the sensor. Scale factors correct between the measured tilt and the output of the tilt sensor. For example, when the actual tilt is 10" (10 arc seconds), the measured tilt may be 9.5". Cross terms are the mix the output of different tilt directions (i.e. it is difficult or impossible to have pitch, without the sensor also indicating roll, and vice versa). Orientation about gravity allows conversion of pitch and roll of the tilt sensor to pitch and roll in the scanner coordinate frame.

In some embodiments, the tilt sensor model can be solved using least squares. The method of least squares (or ordinary least squares OLS) is used to solve over determined systems (systems with more equations than unknowns). Least squares is a method of fitting data. The best fit in the least-squares sense is that instance of the model for which the sum of squared residuals has its least value, a residual being the difference between an observed value and the value given by the model. One of skill in the art will recognize that there are multiple methods by which a model for the tilt sensor may be estimated, least squares being only one, and that any preferred method can be used.

Pitch is rotation around one horizontal axis. For example, in flight dynamics, pitch is rotation around the lateral or transverse axis—an axis running from the pilot's left to right in piloted aircraft, and parallel to the wings of a winged aircraft; thus the nose pitches up and the tail down, or viceversa. Roll is rotation around the other horizontal axis. For example, in flight dynamics, roll is rotation around the longitudinal axis—an axis drawn through the body of the aircraft from tail to nose in the normal direction of flight, or the direction the pilot faces. Yaw is rotation about the vertical axis—an axis drawn from top to bottom, and perpendicular to the other two axes.

A minute of arc, arcminute, or MOA is a unit of angular measurement, equal to one sixtieth ($\frac{1}{60}$) of one degree. Since one degree is defined as one three hundred sixtieth ($\frac{1}{360}$) of a circle, 1 MOA is $\frac{1}{21600}$ of the amount of arc in a closed circle. The standard symbol for marking the arcminute is the prime ('). The subdivision of the minute of arc is the second of arc, or arcsecond. There are 60 arcseconds in an arcminute. Therefore, the arcsecond is $\frac{1}{1296000}$ of a circle, or $(\pi/648000)$ radians, which is approximately $\frac{1}{206265}$ radian. The symbol for the arcsecond is the double prime (").

In some embodiments, a scanner with angular and tilt calibrations performed using an antipodal calibration rig can be a 1" scanner (accurate to within 1 arcsecond). This translates to an accuracy of 1 mm at a distance of 200 meters. Typical scanners have an accuracy of 12-30", so the improved calibration offered by using an antipodal calibration rig according to the teachings disclosed herein is substantial. This level of accuracy approaches the best accuracy provided by total stations.

V. Range Calibration

Range calibration ensures that the scanner is accurately measuring distance to a scanned point. Three dimensional scanning systems may return the coordinates of a point in spherical coordinates. The spherical coordinate system is a coordinate system for representing geometric figures in three dimensions using three coordinates: the radial distance of a point from a fixed origin, the zenith angle from the positive z-axis to the point, and the azimuth angle from the positive x-axis to the orthogonal projection of the point in the x-y plane. Because the point may be represented in spherical coordinates, accurate range measurements in a three dimensional scanning system are crucial. However, regardless of the coordinate system used, accurate range measurements are important for the accuracy of the scanner.

Figure 8:
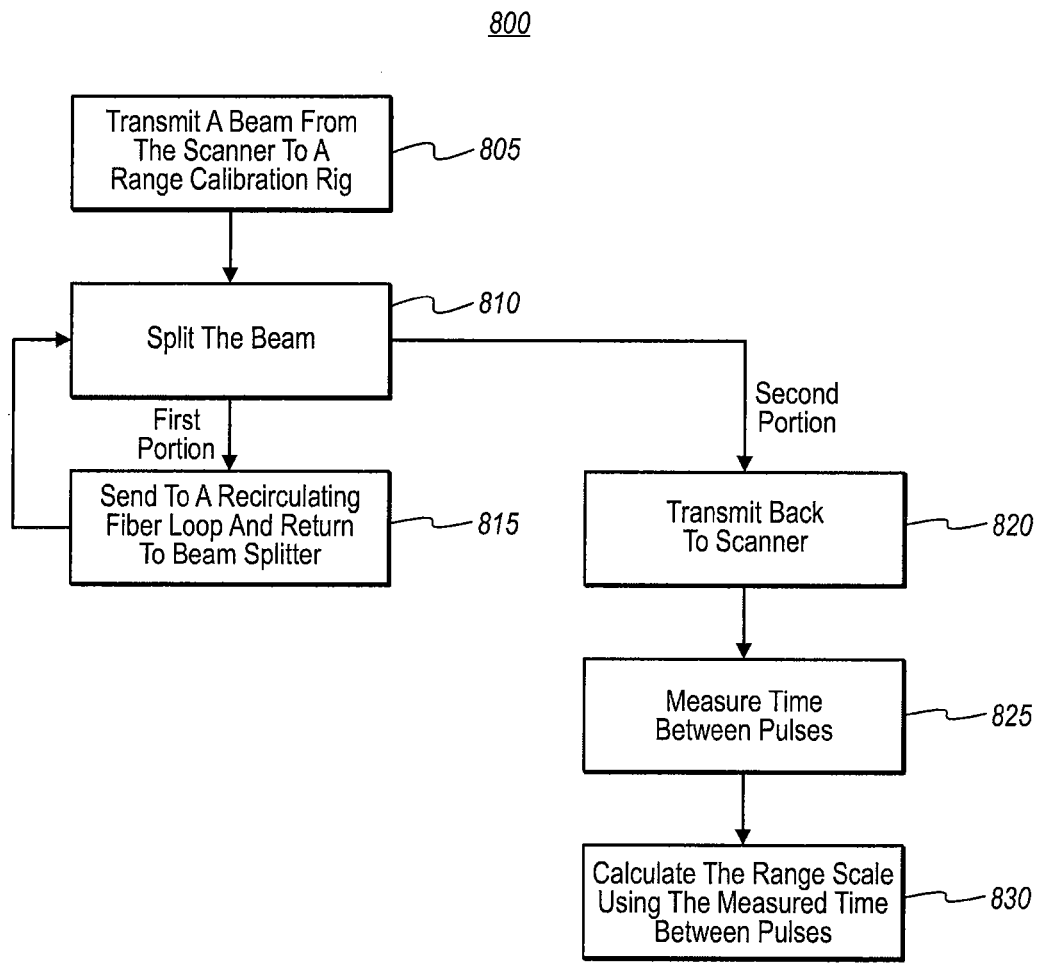
FIG. 8 is a flow diagram illustrating an example of a method for performing a range calibration of a three dimensional scanning system.

FIG. 8 is a flow diagram illustrating an example of a method for performing a range calibration of a three dimensional scanning system (800). The three dimensional scanning system may include a LIDAR scanner or any other type of three dimensional scanning system.

Figure 9A:
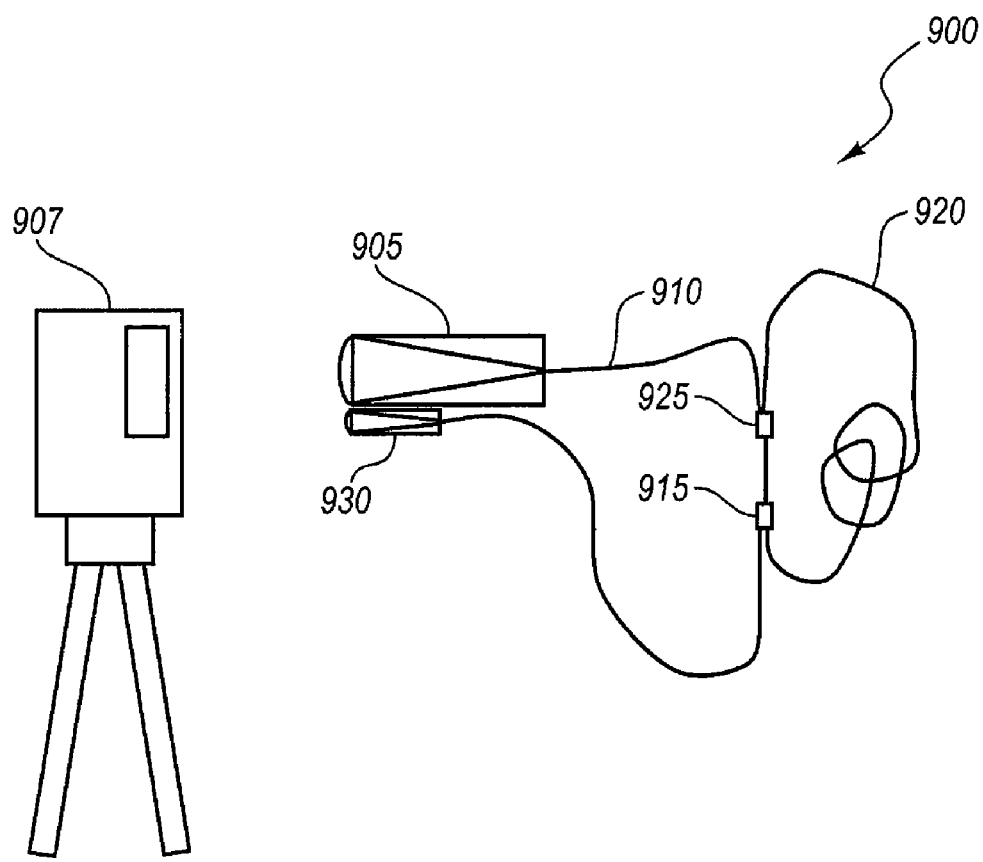
FIG. 9A illustrates an example of a range calibration rig.

The method (800) includes transmitting a beam from the scanner to a range calibration rig (805). In some embodiments, the beam is transmitted to a receiving telescope of the range calibration rig, and focused onto a receiving fiber of the range calibration rig. FIG. 9A illustrates an example of a range calibration rig 900. The range calibration rig 900 includes a receiving telescope 905 for receiving the beam from the scanner 907. The receiving telescope 905 focuses the beam onto a receiving fiber 910. In other embodiments, the range calibration rig 900 includes an open air network and the receiving telescope 905 may not be needed.

Referring again to FIG. 8, the method (800) also includes splitting the beam (810). In some embodiments, the beam is split using a beam splitter. A beam splitter is an optical device that splits a beam of EM radiation into two parts. In other embodiments, the beam is split using a fiber splitter. A fiber splitter is a device for splitting portions of an optical signal transmitted in an optical fiber. The range calibration rig 900 of FIG. 9A includes a fiber splitter 915.

The two parts of the signal need not be equal in power. In some embodiments, the first portion can have a higher portion of the optical power. For example, the first portion could contain 95% of the original power, with the second portion containing 5% of the power. In other embodiments, the first portion could include 90%, 75%, 50%, or any other percentage suitable to perform the range calibration.

Referring again to FIG. 8, the method (800) further includes sending the first portion of the beam to a recirculating fiber loop and returning the first portion to the beam splitter (815), fiber splitter or other device for splitting the beam. In some embodiments, the recirculating fiber loop may be a fiber optic cable of known length. The range calibration rig of FIG. 9A includes a recirculating fiber loop 920 of known length. The recirculating fiber 920 returns the optical signal to the receiving fiber 910 using a fiber combiner 925. In other embodiments, the recirculating fiber loop 910 may be replaced with an open air network with an optical path of known length.

Figure 9B:
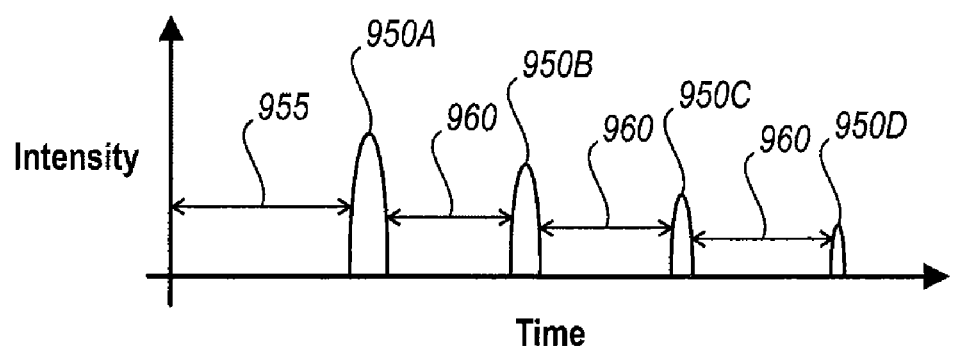
FIG. 9B illustrates the pulses transmitted from the range calibration rig to the scanner.

Referring again to FIG. 8, the method (800) also includes transmitting the second portion of the beam back to the scanner (820). In some embodiments, the second portion can be transmitted using a transmitting lens. The range calibration rig of FIG. 9A includes a transmitting lens 930 for returning the second portion to the scanner 907. In other embodiments, for example in an open air network, the second portion can be directed, using mirrors or other suitable components, to the scanner 907. Because a second portion is split from the optical signal every time the first portion passes through the splitter 915, pulses will be transmitted to the scanner 907 at regular intervals, with each pulse decreasing exponentially in power. FIG. 9B illustrates the pulses 950A, 950B, 950C and 950D transmitted from the range calibration rig 900 to the scanner 907 showing the decrease in power.

Referring again to FIG. 8, the method (800) further includes measuring the time between the pulses at the scanner (825). FIG. 9B illustrates the time intervals being measured. The first time interval 955 indicates the time that the beam requires to travel through the range calibration rig 900 and begin returning to the scanner 907. The pulses continue to arrive at the scanner 907 at regular intervals 960 thereafter, with the interval 960 corresponding to the time the pulse takes to travel through the recirculating fiber 920. The first time interval 955 is not necessarily, but may be, longer than the second interval 960.

Referring again to FIG. 8, the method (800) also includes calculating the range scale using the measured time between pulses (830). In some embodiments, the observed length of the recirculating fiber may be calculated by multiplying the speed of light in the fiber by the time between pulses. In other embodiments, the observed length of the optical path in the open air network may be calculated by multiplying the speed of light in the open air network by the time between pulses. The range scale can then be calculated by comparing the known length of the recirculating fiber or open air network against the observed length.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for calibrating a tilt sensor of a three dimensional optical scanning system comprising:
   locating the scanning system on a tilt table within an antipodal calibration rig, wherein the antipodal calibration rig includes two or more telescopes mounted on the antipodal calibration rig, wherein the two or more telescopes are used to measure the tilt of the three dimensional optical scanning system;
   performing an angular calibration on the three dimensional optical scanning system;
   solving for a tilt index of the three dimensional optical scanning system;
   performing a set of steps including:
      moving the tilt table to a next tilt position;
      obtaining an actual output of the tilt sensor;
      measuring the position of the two or more telescopes; and
      computing the expected output of the tilt sensor using the measured position of the two or more telescopes;
   repeating the set of steps for a total of three or more tilt positions of the three dimensional optical scanning system; and
   computing an estimated tilt sensor model using the measurements.

2. A method according to claim 1, wherein the three dimensional optical scanning system includes a LIDAR scanner.

3. A method according to claim 1, wherein the two or more telescopes mounted on the antipodal calibration rig include a target within the one or more telescopes.

4. A method according to claim 1, wherein the two or more telescopes mounted on the antipodal calibration rig include autocollimators.

5. A method according to claim 1, wherein solving for the tilt index includes a circle measurement and a least squares calculation.

6. A method according to claim 1, wherein solving for the tilt index includes a two face measurement.

7. A method according to claim 1, wherein the set of steps further includes computing the next approximate tilt position before moving the tilt table to the next tilt position.

8. A method according to claim 1, wherein computing the estimated tilt sensor model includes computing a scale factor and cross terms.

9. A method according to claim 8, wherein the scale factor includes the difference between the output of the tilt sensor and the actual tilt.

10. A method according to claim 9, wherein cross terms include the tilt of the sensor along the axis perpendicular to the intended tilt axis.

11. A method according to claim 1, further comprising calculating an error plot using the measurements.

12. A three dimensional optical scanning system calibrated according to the method of claim 1.

* * * * *